May 20, 1930.  J. E. DANIELS  1,759,101
ADJUSTABLE FLOATING TOOL HOLDER
Filed June 9, 1928   2 Sheets-Sheet 1
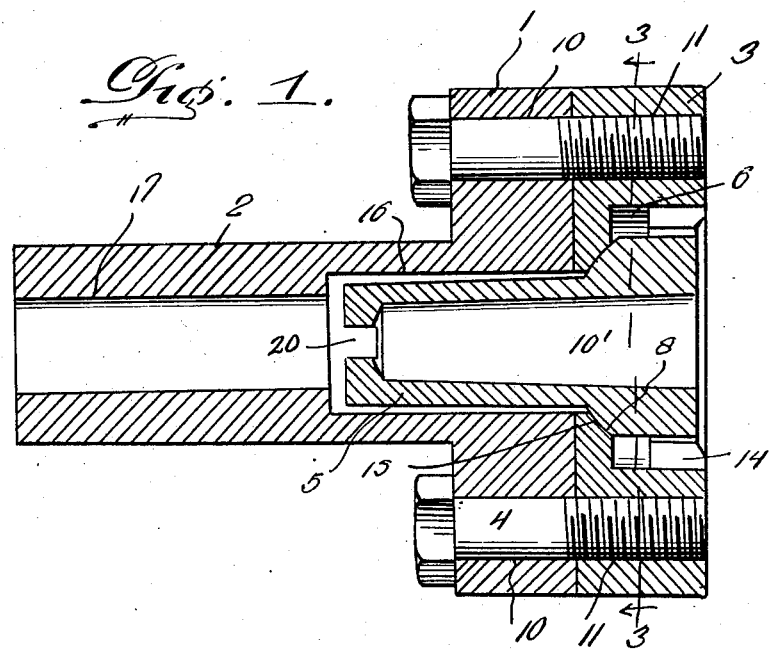
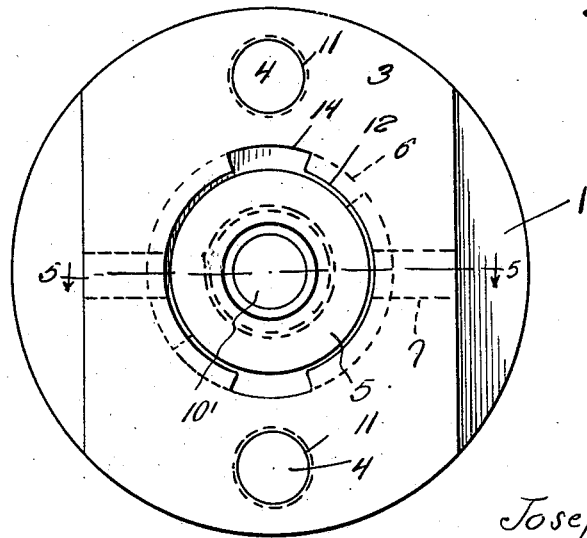
Inventor
Joseph E. Daniels
By Clarence A. O'Brien
Attorney May 20, 1930. J. E. DANIELS 1,759,101
ADJUSTABLE FLOATING TOOL HOLDER
Filed June 9, 1928 2 Sheets-Sheet 2
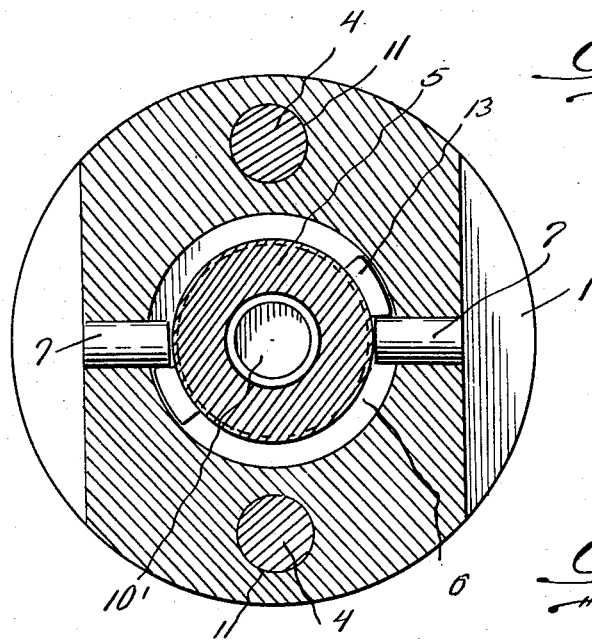
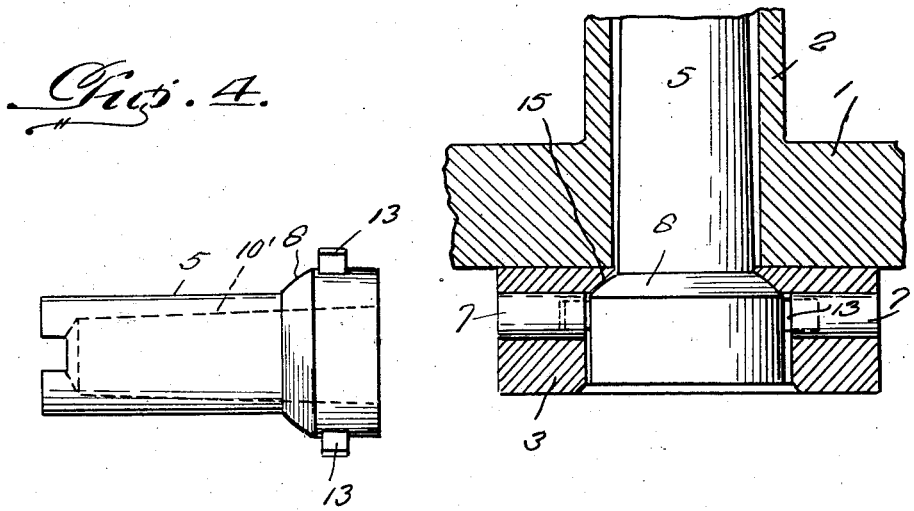
Inventor
Joseph E. Daniels
By Clarence A. O'Brien
Attorney Patented May 20, 1930

1,759,101

UNITED STATES PATENT OFFICE

JOSEPH E. DANIELS, OF CLIFTON, NEW JERSEY

ADJUSTABLE FLOATING TOOL HOLDER

Application filed June 9, 1928. Serial No. 284,232.

The present invention relates to an adjustable floating tool holder.

In the turret lathes and automatic screw machines, it is usually found to be quite impossible to ream a perfectly parallel hole of any length to an exact diameter and perfectly smooth, with a reamer of the same size.

To accomplish this, it is customary to use what is commonly called, "floating tool holders", but there is seldom to be found any that are perfectly in line with the spindle, which after the reamer has entered the hole will ream the exact diameter of the reamer, the entire length of the hole in the material being worked.

A similar condition exists when drilling, counter boring, and packing holes.

The prime object of the present invention is to overcome these difficulties by an improved structure which is capable of easy manipulation and adjustment, to the circumstances encountered.

Another very important object of the invention resides in the provision of a floating tool holder of this nature, which is comparatively simple in its construction, inexpensive to manufacture, strong and durable, thoroughly efficient and reliable in its operation, compact and convenient, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is a longitudinal section through the tool holder, embodying the features of this invention.

Figure 2 is a front elevation thereof.

Figure 3 is a transverse section taken substantially on the line 3—3 of Figure 1.

Figure 4 is a side elevation of the sleeve, and

Figure 5 is a fragmentary detail section, taken substantially on the line 5—5 of Figure 2.

Referring to the drawings in detail, it will be seen that the numeral 5 denotes a sleeve, having a tapered bore 10, for the reception of the reamer shank. When the tool, such as the reamer is to be used many times, the sleeve is not to be removed, but in practice, becomes a temporary part of the actual shank, and to remove the tool, the sleeve 5 is also removed.

The numeral 1 denotes the body of the holder, which is provided with a hollow shank 2 extending therefrom. This shank goes into a turret or the like, for holding the holder. This shank 2 may be straight or tapered as desired. The body 1 is provided with two or more holes 10, of any suitable diameter or shape, through which screws 4 pass. The numeral 3 denotes an adjustable base plate having threaded openings 11, to receive the threaded portions of the screws 4. This plate 3 is flat on the back, and makes a joint with the face of the body 1, so that when the screws 4 are tightened, the plate 3 is clamped fast against the body 1, and cannot be moved. The holes 10 in the body 1 are of a sufficient clearance larger than the screw 4, so that the base plate 3 may be moved in any desired direction across the body face, to meet the requirements and then the screws 4 are tightened. When the shank 2 is in the turret of the screw machine, the sleeve 5 which has been previously cut on the shank of the reamer is put in the center hole 12 of the base plate 3. The driving lugs 13, radiating from the sleeve slide through apertures 14, in the face plate, until they rest in groove 6 and by a quarter turn will stop against driving pins 7, in the face plate, extending radially thereof, into the groove 6. By the conception thus shown and described, the sleeve 5 is provided with a spherical shoulder 8, to engage a spherical seat 15, in the face plate. The spherical shoulder is situated near the front end of the sleeve and takes all of the pressure of end thrust and the hole 15, through the body 1 and a portion of the shank 2 and the reduced hole 17 of the shank 2 are of a size to permit any adjustment of the base plate 3 without interfering with the long inserted end of the sleeve 5. The hole 17 is provided merely for the purpose of lightening the shank.

The adjustable floating tool holder, being in place, to set the adjustable face plate true with the spindle, it is necessary to put a piece of stock in the collet or chuck then chamfer the ends.

To ream, tap or drill a true hole, loosen the screws 4, move the turret with the holder up, and so that the chamfered end of the stock in the collet enters the chamfer in the base plate 3, then tighten the screws 4, move the turret back, insert the sleeve with the reamer, and proceed with the operation. Should it be necessary to use more than one size of reamer or do any number of operations at one setting of the work, it will be only necessary to take out the sleeve 5, with the reamer, by giving it a quarter turn in the opposite direction, and then insert another sleeve, retaining the next tool to be used, as above explained. This may be repeated as often as necessary, and for as many jobs as are to be worked up to the capacity of the adjustable floating tool holder. Tool holders may be made to suit any size turret or class of work. The groove 6, in Figure 1, is wider than the driving lugs and allows the sleeve 5 to adjust itself true with the center of the driving head stock, by the spherical shoulder even though the hole in the turret should not be in alignment or point at an angle to the dead center of the head stock and spindle hole.

When the adjustable floating tool holder is once set through in a certain machine and not removed, it will remain so no matter how many times a sleeve or sleeves are put in or taken out, therefore will not ream a bell mouth shaped hole, but will ream a dead true hole, the exact size of the reamer being used. The shank hole in the sleeve 5 may be furnished to take any one of either tapered, straight, square or any shaped shank desired, as specified by users, and is provided with slots at the innermost depth to take the extreme end of tool to be used, as indicated at 20.

By the use of an adjustable tool holder of this character, the turret may be far out of line with the driving head stock of the machine and the reamed hole will be dead true and to size. In connection with the actual example shown herein, it is thought that the construction and operation will be thoroughly understood.

The present embodiment of the invention has been disclosed in detail, merely by way of example, since in actual practice it attains the feature of advantage, enumerated as desirable in the statement of the invention and the above description. It will be apparent that changes in the details of construction and in the combination and arrangement of parts may be resorted to, without departing from the spirit or scope of the invention as hereinafter claimed, or sacrificing any of its advantages.

Having thus described my invention, what I claim as new is:

A floating tool holder of the class described, comprising a body with a shank extending therefrom, said body and said shank having a central opening, said body having openings adjacent the periphery thereof, a base plate on the body, screws through the peripheral openings of the body, and threadedly engaged in the base plate for holding the base plate in place, said base plate being provided with an opening registering with the first mentioned opening, and an annular channel with entrances from the front of the face plate, a sleeve having a hole for receiving a tool shank and having driving lugs radiating therefrom to be inserted to the channel through the entrances, pin stops in the base plate extending into the channel and against which the lugs are adapted to abut when the sleeve is turned.

In testimony whereof I affix my signature.

JOSEPH E. DANIELS.